United States Patent [19]

Nitanai et al.

[11] 3,926,959
[45] Dec. 16, 1975

[54] PENICILLINE DERIVATIVES

[75] Inventors: Kiyoaki Nitanai; Atsuo Okubo; Hideo Yamazaki, all of Kanagawa, Japan

[73] Assignee: Mitsui Toatsu Chemicals, Incorporated, Chiyoda-ku, Tokyo, Japan

[22] Filed: May 16, 1974

[21] Appl. No.: 470,600

[30] Foreign Application Priority Data

May 21, 1973 Japan................................. 48-55580
May 21, 1973 Japan................................. 48-55582

[52] U.S. Cl............................. 260/239.1; 424/271
[51] Int. Cl.²...................................... C07D 499/62
[58] Field of Search................................ 260/239.1

[56] References Cited
UNITED STATES PATENTS 2,528,175  10/1950  Rhodehamel, Jr............... 260/239.1
2,647,894  8/1953  Ford............................... 260/239.1

*Primary Examiner*—Gerald A. Schwartz
*Attorney, Agent, or Firm*—Lane, Aitken, Dunner & Ziems

[57] ABSTRACT

New semi-synthesized penicillins containing a sulfur atom in the side chain of the 6-aminopenicillanic acid moiety. These new penicillin derivatives exhibit at a low concentration an excellent antibacterial effect to various Gram-positive bacteria.

5 Claims, No Drawings

PENICILLINE DERIVATIVES

BACKGROUND OF THE INVENTION

This invention relates to new penicillin derivatives and a process for preparing same. More particularly, this invention relates to new semi-synthesized penicillins containing a sulfur atom in a side chain of the 6-aminopenicillanic acid moiety and to a process for preparing same.

Penicillins containing a sulfur atom in their side chain are already known. Allylthiomethylpenicillin is known as Penicillin O and disclosed in U.S. Pat. No. 2,623,876. Other sulfur-containing penicillins are exemplified, for example, in British Pat. No. 646,819, 795,934, 878,233, 880,042, 890,201, 981,279 and 948,817; U.S. Pats. No. 2,479,295, 2,479,297, 2,623,876 and 3,040,033; and Belgian Pat. No. 636,175. These known sulfur-containing penicillins display strong antibacterial action at a high concentration but their action is not sufficient enough at a low concentration. Accordingly, there is a great demand for developing a new class of penicillins which possess a strong, broad spectrum antibacterial activity even at a low concentration.

BRIEF SUMMARY OF INVENTION

It is an object of this invention to provide new sulfur-containing penicillin derivatives which exhibit at a low concentration a strong antibacterial effect to various Gram-positive bacteria.

It is another object of this invention to provide a process for preparing the new sulfur-containing penicillin derivatives wherein 6- aminopenicillanic acid is reacted with a specific sulfur-containing carboxylic acid derivative.

It is still another object of this invention to provide a pharmaceutical composition comprising the new sulfur-containing penicillin derivative as active ingredient.

Other objects, features and advantages of this invention will become apparent as the description proceeds.

DETAILED DESCRIPTION OF THE INVENTION

As the result of many researches made for developing new penicillin derivatives, it has now been found that a certain new class of sulfurcontaining penicillins possess a strong antibacterial activity even at an extremely low concentration against broad spectra of Gram-positive bacteria and can be used effectively as excellent antibacterial agents. This invention has been accomplished on the basis of the above finding.

In accordance with this invention, there is provided new sulfurcontaining penicillins of the general formula:

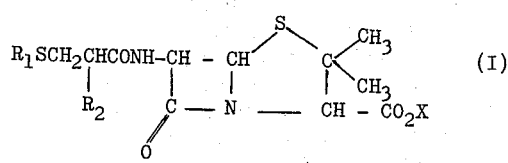 (I)

or

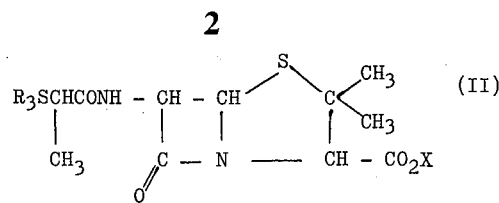 (II)

wherein $R_1$ is phenyl, benzyl, allyl or tert-butyl, $R_2$ is hydrogen or methyl, with the proviso that when $R_1$ is benzyl, $R_2$ is methyl, $R_3$ is benzyl or tert-butyl, and X is hydrogen or a nontoxic, pharmaceutically acceptable metal cation such as sodium, potassium, calcium, aluminum or the like, the ammonium cation, a substituted ammonium cation e.g., a cation of such nontoxic amines as di-or tri-(lower) alkylamines i.e., dimethylamine, trimethylamine, triethylamine, etc., procaine or other such amines which have been used to form pharmaceutically acceptable nontoxic salts with penicillin, are prepared by the treatment of 6-aminopenicillanic acid with the corresponding S-containing carboxylic acid derivative, which comprises condensing a reactive derivative at the carboxyl group of an organic acid of the general formula:

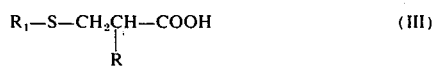 (III)

or

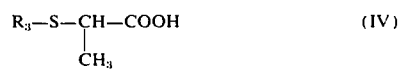 (IV)

wherein $R_1$, $R_2$ and $R_3$ have the same meanings as given above.

All of the penicillins represented by the general formulas (I) and (II) are new compounds which have never disclosed in literatures and exhibit strong antibacterial action to Gram-positive bacteria. Thus, these penicillins are particularly useful as medicaments and veterinary medicines. Among these penicillins, those possessing antibacterial effect against Gram-negative bacteria are also found.

As some starting materials for the products of this invention contain an asymmetrical carbon atom, the products of this invention obtained from such starting materials involve some stereoisomers. All of these stereoisomers, irrespective of whether they are the individual isomers or a mixture thereof, are included in the scope of this invention.

The reactive derivative at the carboxyl group of an organic acid of the general formula (III) or (IV) is a compound capable of reacting with 6-aminopenicillanic acid to produce a compound of the general formula (I) or (II), for example, an acid halide, an acid anhydride, especially a mixed acid anhydride or an acid azide of the organic acid. Illustrative of the acid halide are acid chloride and acid bromide. Suitable as the mixed acid anhydride is generally an acid anhydride of the organic acid with a mono lower alkyl ester of carbonic acid. A reactive derivative formed by dehydrocondensing the organic acid with N,N'-carbodiimide or N,N'-carbodiimidazole can also be used in the process of this invention.

The products of this invention include various salts of said penicillins. More specifically, such salts include those with metals such as sodium, potassium, calcium and aluminum and those with amines such as ammonium, dimethylamine, trimethylamine and procain.

The reaction adopted in this invention is a condensation reaction between a reactive derivative of an organic acid of the general formula (III) or (IV) with 6-aminopenicillanic acid. This reaction proceeds even in the absence of a solvent and/or an acid-binding agent but is usually carried out in the presence of a proper solvent and an acid-binding agent. Examples of the solvent include chloroform, methylene chloride, ether, toluene, ethyl acetate, dioxane, benzene, acetone, water and a mixture of these. As the acid-binding agent, there can be used, for example, an organic base such as triethylamine, N-ethylpiperidine or dimethylamine, or an inorganic salt such as sodium bicarbonate. The reaction temperature is preferably within the range of -50°C to 30°C. The reactants are used in equimolar amount. If necessary, however, either one of the reactants may be used in excess for facilitating the purification of the resulting penicillin and for increasing the yield thereof.

The resultant penicillins can be isolated and purified in a usual manner and then converted into desired salts in a usual manner.

The following table shows the results of tests for antibacterial activity made on typical compounds of this invention.

Table

In vitro antibacterial activities of new synthesized penicillins and aminobenzyl penicillin against Gram-positive organisms MIC (mcg/ml)

| $R_1$ | phenyl | phenyl | phenyl-$CH_2$- | $CH_2=CHCH_2$- | $CH_2=CHCH_2$- | t-Butyl | t-Butyl | phenyl-$CH_2$- | t-Butyl | Aminobenzyl penicillin |
|---|---|---|---|---|---|---|---|---|---|---|
| $R_2$ | H- | $CH_3$- | $CH_3$- | H- | $CH_3$ | H- | $CH_3$- | | | |
| $R_3$ | | | | | | | | | | |
| Kind of salt | Na salt | Na salt | Na salt | K salt | Na salt | K salt | Na salt | K salt | K salt | penicillin |
| Microorganisms | | | | | | | | | | |
| Staphylococus aureus 209 P | 0.2 | 0.1 | 0.05 | 0.02 | 0.1 | 0.04 | 0.02 | 0.02 | 0.05 | 0.1 |
| Staphylococus aureus | 0.1 | 0.2 | 0.1 | 0.02 | 0.1 | 0.05 | 0.05 | 0.02 | 0.1 | 0.2 |
| " * | 0.1 | 0.2 | 0.2 | 0.02 | 0.1 | 0.1 | 0.05 | 0.05 | 0.1 | 0.1 |
| " * | 0.1 | 0.1 | 0.2 | 0.1 | 0.4 | 0.4 | 0.1 | 0.2 | 0.2 | 0.1 |
| " * | 0.2 | 0.2 | 0.1 | 0.02 | 0.1 | 0.1 | 0.05 | 0.02 | 0.1 | 0.2 |
| " * | 0.2 | 1.56 | 0.05 | 0.05 | 0.4 | 0.1 | 0.02 | 0.1 | 0.05 | 1.56 |
| " * | 0.2 | 3.12 | 0.05 | 0.05 | 0.1 | 0.1 | 0.05 | 0.05 | 0.05 | 3.12 |
| Diplococcus pneumoniae | 0.05 | 0.05 | 0.05 | 0.02 | 0.1 | 0.05 | 0.02 | 0.02 | 0.05 | 0.1 |
| Diplococcus pneumoniae | 0.05 | 0.05 | 0.05 | 0.02 | 0.1 | 0.05 | 0.02 | 0.02 | 0.05 | 0.1 |
| Streptococcus hemolyticus T-4 (A Group) | 0.05 | 0.05 | 0.05 | 0.02 | 0.1 | 0.05 | 0.02 | 0.02 | 0.05 | 0.1 |
| Streptococcus hemolyticus T-12 (A Group) | 0.05 | 0.05 | 0.05 | 0.02 | 0.1 | 0.05 | 0.02 | 0.02 | 0.05 | 0.1 |
| Streptococcus hemolyticus (A Group)* | 0.05 | 0.1 | 0.1 | 0.02 | 0.2 | 0.05 | 0.05 | 0.02 | 0.05 | 0.1 |
| Streptococcus faecalis (hemolytic)* | 3.12 | 6.25 | 3.12 | 3.12 | 12.5 | 6.25 | 25 | 3.12 | 25 | 6.25 |
| Streptococcus faecalis (hemolytic)* | 3.12 | 3.12 | 3.12 | 3.12 | 6.25 | 6.25 | 25 | 3.12 | 25 | 6.25 |

*Isolated from patients

The following examples illustrate synthesis of the penicillins of this invention.

EXAMPLE 1

Preparation of sodium 6-[3-(phenylthio) propionamido] penicillanate 24.2 Grams of thionyl chloride were added to 7.4 g of β-phenylthiopropionic acid and the mixture was reacted under reflux at its boiling point until hydrogen chloride gas was no longer evolved. The remaining unreacted thionyl chloride in the reaction product was removed by distillation under ambient pressure and then the product was distilled under reduced pressure to obtain 60 g of 3-phenylthiopropionyl chloride boiling at 125 -126°C/5 mmHg. This acid chloride was added to 180 ml of acetone and then 6.5 g of 6-aminopenicillanic acid dissolved in a mixture of 250 ml of a 3 % aqueous solution of sodium bicarbonate and 30 ml of acetone previously kept at 0 -5°C were added. The mixture was reacted for 4 hours under agitation. After completion of the reaction, the reaction liquid was extracted three times with 100 ml of ethyl ether at room temperature. The remaining aqueous phase was acidified (pH 2) with 1-N hydrochloric acid and then extracted three times with 100 ml of ethyl ether. The ethereal extracts were collected and a 3 % aqueous solution of sodium bicarbonate was added thereto so as to take up the end product in the aqueous phase. The aqueous phase was then made neutral (pH 7). The above mentioned operation for acidification of the aqueous phase followed by extraction with ethyl ether was repeated twice and the resulting neutral aqueous solution was dried at a low temperature in a vacuum desiccator packed with phosphorus pentoxide. After drying the product for about 3 days, 4.5 g of sodium salt of β-phenylthioethyl penicilin having a melting point of 150°C (with decomposition) were obtained in the form of white crystals.

Shown below are the main IR-absorption spectra of the product measured according to the KBr method. 1785 cm$^{-1}$ (β-lactam), 1510 cm$^{-1}$, 1685 cm$^{-1}$ (—CONH—) and 1610 cm$^{-1}$ (COO$^-$).

The result of an elementary analysis of the product as $C_{17}H_{19}N2O_4S_2Na \cdot H_2O$ (420.50) is as follows:

|  | C (%) | H (%) | N (%) | S (%) |
|---|---|---|---|---|
| Calc. | 48.55 | 5.03 | 6.66 | 15.25 |
| Found | 48.51 | 5.01 | 6.19 | 14.66 |

EXAMPLE 2

Preparation of sodium 6-[3-(phenylthio) isobutyramido]-penicillanate

In 420 ml of dry acetone were dissolved 9.8 g of β-phenylthioisobutyric acid and 8.3 ml of triethylamine. 5.5 Grams of ethyl chloroformate were then added to the mixture under agitation at 0°C. 13.0 Grams of 6-aminopenicillanic acid dissolved in 420 ml of 3 % aqueous solution of sodium bicarbonate which had previously been cooled to 0–5°C were added to the mixture and the whole was stirred at 0°C for one hour to effect reaction. After completion of the reaction, the reaction mixture was extracted thrice with 100 ml of ethyl ether at room temperature and the ethereal extracts were collected and admixed with 3 % aqueous solution of sodium bicarbonate to take up the end product in the aqueous phase which was then neutralized (pH 7). The operations for acidification and extraction with ethyl ether were repeated twice for the aqueous phase and the neutralized aqueous phase was concentrated in vacuo at room temperature. Acetone was added to the residue and the precipitated white crystals were collected by filtration and washed with acetone. The collected crystals were dried over phosphorus pentoxide in a vacuum desiccator to obtain 5.5 g of sodium 6-[3-(phenylthio) isobutyramido]penicillanate having a melting point of 175 – 178°C.

Shown below are the main IR-absorption spectra of the product measured according to the KBr method. 1775 cm$^{-1}$ (β-lactam), 1520 cm$^{-1}$, 1660 cm$^{-1}$ (—CONH—) and 1615 cm$^{-1}$ (COO$^-$).

EXAMPLE 3

Preparation of sodium 6-[3-(benzoylthio) isobutyramido]penicillanate 6.7 Grams of methyl β-benzylthioisobutyrate were hydrolyzed in an aqueous solution of caustic soda and then acidified (pH 1) with sulfuric acid to obtain 5.3 g of β-benzylthioisobutyric acid as white crystals. This compound was reacted with 6.5 g of 6-aminopenicillanic acid and worked up in a manner similar to that described in Example 2 to obtain 3.0 g of sodium 6-[3-(benzylthio) isobutyramido]penicillanate in the form of white crystals having a melting point of 155 – 158°C.

Shown below are the main IR-absorption spectra of the product measured according to the KBr method. 1775 cm$^{-1}$ (β-lactam), 1520 cm$^{-1}$, 1675 cm$^{-1}$ (—CONH—) and 1620 cm$^{-1}$ (COO$^-$).

EXAMPLE 4

Preparation of potassium 6-[3-(allylthio) propionamido]penicillanate

In 200 ml of dry acetone were dissolved 3.3 g of 3-allylthiopropionic acid and 3.0 g of triethylamine. 2.4 Grams of ethyl chloroformate were then added to the mixture under agitation at 0°C. 6.5 Grams of 6-aminopenicillanic acid dissolved in 200 ml of 3 % aqueous solution of sodium bicarbonate which had been cooled previously to 0 – 5°C were added to the mixture and the whole was stirred below 0°C for one hour to effect reaction. After completion of the reaction, the reaction mixture was extracted thrice with 100 ml of ethyl ether at room temperature and the remaining aqueous phase was acidified (pH 2) with 1-N hydrochloric acid whereby the aqueous phase became opaque. The aqueous phase was then extracted thrice with 100 ml of ethyl ether and the ethereal extracts were collected and admixed with 3 % aqueous solution of sodium bicarbonate to take up the end compound in the aqueous phase which was then neutralized (pH 7). The operations for acidification and extraction with ethyl ether were repeated twice for the aqueous phase and thereafter the aqueous phase was again acidified. The aqueous phase was extracted thrice with 100 ml of ethyl ether and the ethereal extracts were collected and dried over anhydrous magnesium sulfate. A solution of 4.5 g of potassium 2-ethylhexanoate in 100 ml of a mixture of ethyl ether and methanol was slowly added dropwise to the ethereal extract under agitation whereby white powdery crystals were precipitated. This crystals were collected by filtration and dried over phosphorus pentoxide in a vacuum desiccator. 4.7 Grams of potassium 6-[3-(allylthio) propionamido]penicillanate having a melting point of 192 – 194°C (with decomp.) were thus obtained.

Shown below are the main IR-absorption spectra of the product measured according to the KBr method. 1780 cm$^{-1}$ (β-lactam), 1505 cm$^{-1}$, 1680 cm$^{-1}$ (—CONH—) and 1615 cm$^{-1}$ (COO$^-$)

The result of an elementary analysis of the product as $C^{14}H_{16}N_2O_4S_2K$ (382.55) is as follows:

|  | C (%) | H (%) | N (%) |
|---|---|---|---|
| Calc. | 43.96 | 5.01 | 7.32 |
| Found | 43.21 | 4.92 | 7.30 |

EXAMPLE 5

Preparation of sodium 6-[3-(allylthio)isobutyramido]penicillanate 11.0 Grams of methyl β-allylthioisobutyrate were hydrolyzed in an aqueous solution of caustic soda and the solution was then acidified (pH 1) with sulfuric acid. The oily residue was distilled under reduced pressure (2 mmHg) whereby 4.0 g of β-allylthioisobutyric acid boiling at 110 – 115°C were obtained. In the same manner as described in Example 2, 4.5 g of this acid were reacted with 6.5 g of 6-aminopenicillanic acid. The reaction mixture was treated in a similar manner to obtain 3.0 g of sodijm 6-[3-(allyl-thio) isobutyramido]-penicillanate as light yellow crystals having a melting point of 167 – 169°C.

Shown below are the main IR-absorption spectra of the product measured according to the KBr method.

1760 cm$^{-1}$ (β-lactam), 1520 cm$^{-1}$, 1670 cm$^{-1}$ (—CONH—) and 1600 cm$^{-1}$ (COO$^-$)

EXAMPLE 6

Preparation of potassium 6-[3-(tert-butylthio)propionamido]penicillanate

In the same manner as described in the foregoing Example 4, 6.5 g of tert-butylthiopropionic acid were reacted with 10.8 g of 6-aminopenicillanic acid and the reaction mixture was treated to obtain 7.8 of potassium 6-[3-(tert-butylthio) propionamido]penicillanate having a melting point of 221 – 223°C.

Shown below are the main IR-absorption spectra of the product measured according to the KBr method.
1775 cm$^{-1}$ (β-lactam), 1505 cm$^{-1}$, 1680 cm$^{-1}$ (—CONH—) and 1610 cm$^{-1}$ (COO$^-$).

The result of an elementary analysis of the product as $C_{15}H_{23}N_2O_4S_2K$ (398.60) is as follows:

|  | C (%) | H (%) | N (%) |
|---|---|---|---|
| Calc. | 45.20 | 5.82 | 7.03 |
| Found | 44.61 | 5.95 | 6.61 |

EXAMPLE 7

Preparation of sodim 6-[3-(tert-butylthio)isobutyramido]penicillanate 7.0 Grams of methyl tert-butylthioisobutyrate obtained by reacting tert-butylmercaptan with methyl methacrylate in the presence of sodium methylate were hydrolyzed with 20 % aqueous solution of caustic soda and the solution was then acidified (pH 2) with sulfuric acid. The oily substance was distilled under reduced pressure (5 mmHg) whereby 4.4 g of tert-butylthioisobutyric acid were obtained as a fraction boiling at 125 – 126°C.

In the same manner as described in the foregoing Example 2, 4.4 g of this acid were used in place of β-phenylthioisobutyric acid to react with 6.5 g of 6-aminopenicillanic acid and the reaction mixture was treated in a similar manner to obtain 4.6 g of sodium 6-[3-(tertbutylthio) isobutyramido]penicillanate as white crystals having a melting point of 184 – 187°C.

Shown below are the main IR-absorption spectra of the product measured according to the KBr method.
1765 cm$^{-1}$ (β-lactam), 1520 cm$^{-1}$, 1665 cm$^{-1}$ (—CONH—), 1600 cm$^{-1}$ (COO$^-$).

EXAMPLE 8

Preparation of potassium 6-[2-(benzylthio)propionamido]penicillanate

In the same manner as described in the foregoing Example 4, 7.9 g of 2-benzylthiopropionic acid were reacted with 10.8 g of 6-aminopenicillanic acid and the reaction mixture was treated to obtain 4.5 g of potassium 6- 2-(benzylthio) propionamido penicillanate as white crystals having a melting point of 198 – 199°C.

Shown below are the main IR-absorption spectra of the product measured according to the KBr method.
1770 cm$^{-1}$ (β-lactam), 1500 cm$^{-1}$, 1660 cm$^{-1}$ (—CONH—) and 1600 cm$^{-1}$ (COO$^-$).

The result of an elementary analysis of the product as $C_{18}H_{21}N_2O_4S_2K$ (432.62) is as follows:

|  | C (%) | H (%) | N (%) | S (%) |
|---|---|---|---|---|
| Calc. | 49.97 | 4.89 | 6.48 | 14.82 |
| Found | 49.63 | 5.13 | 6.10 | 14.93 |

EXAMPLE 9

Preparation of potassium 6-[2-(tert-butylthio)propionamido]-penicillanate

In the same manner as described in the foregoing Example 4, 4.1 g of 2-tert-butylthiopropionic acid were reacted with 6.5 g of 6-aminopenicillanic acid and the reaction mixture was treated to obtain 3.2 g of potassium 6-[2-(tert-butylthio) propionamido]penicillanate as white crystals having a melting point of 201 – 204°C.

Shown below are the main IR-absorption spectra of the product measured according to the KBr method.
1775 cm$^{-1}$ (β-lactam), 1505 cm$^{-1}$, 1680 cm$^{-1}$ (—CONH—) and 1610 cm$^{-1}$ (COO$^-$)

What is claimed is:

1. Penicillin derivatives of the general formula:

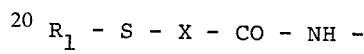

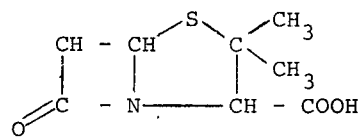

wherein: X is

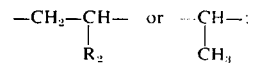

R$_1$ is phenyl or benzyl R$_2$ is hydrogen or methyl, provided that when R$_1$ is benzyl and X is

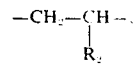

R$_2$ is methyl; provided further, that when X is

R$_1$ is benzyl and nontoxic, pharmaceutically acceptable salts thereof.

2. 6-[3-(phenylthio)-propionamido]-penicillanic acid and nontoxic, pharmaceutically acceptable salts thereof.

3. 6-[3-(phenylthio)-isobutyramido]-penicillanic acid and nontoxic, pharmaceutically acceptable salts thereof.

4. 6-[3-(benzylthio)-isobutyramido]-penicillanic acid and nontoxic, pharmaceutically acceptable salts thereof.

5. 6-[2-(benzylthio)-propionamido]-penicillanic acid and nontoxic, pharmaceutically acceptable salts thereof.

\* \* \* \* \*

UNITED STATES PATENT OFFICE
CERTIFICATE OF CORRECTION

Patent No. 3,926,959                Dated December 16, 1975

Inventor(s) Kiyoaki Nitanai; Atsuo Okubo; and Hideo Yamazaki

It is certified that error appears in the above-identified patent and that said Letters Patent are hereby corrected as shown below:

Page 1, in the title, "PENICILLINE" should read --PENICILLIN--.

Column 1, line 1, "PENICILLINE" should read --PENICILLIN--.

Column 5, line 12, "$C_{17}H_{19}N2O_4S_2Na$" should read --$C_{17}H_{19}N_2O_4S_2Na$--;

line 68, "(__CONH__) and" should read --(-CONH-) and--.

Column 6, line 44, "$C^{14}H_{16}N_2O4S_2K$" should read --$C_{14}H_{16}N_2O_4S_2K$--;

Signed and Sealed this

Third Day of August 1976

[SEAL]

Attest:

RUTH C. MASON
Attesting Officer

C. MARSHALL DANN
Commissioner of Patents and Trademarks